United States Patent [19]

Tantlinger

[11] 3,995,874
[45] Dec. 7, 1976

[54] PIVOTED FRONT STEP AND ANGLED UNDER BODY FOR LOW FLOOR BUS

[75] Inventor: Keith W. Tantlinger, Coronado, Calif.

[73] Assignee: Rohr Industries, Inc., Chula Vista, Calif.

[22] Filed: Nov. 17, 1975

[21] Appl. No.: 632,183

[52] U.S. Cl. .................................. 280/166; 182/91
[51] Int. Cl.² ............................................ B60R 3/02
[58] Field of Search .............. 280/166, 163, 164 R, 280/164 A; 105/445, 447, 437, 450; 182/91

[56] References Cited

UNITED STATES PATENTS

| | | | |
|---|---|---|---|
| 1,467,976 | 9/1923 | Gannon | 280/166 |
| 2,324,507 | 7/1943 | Johnson | 280/166 |
| 3,039,562 | 6/1962 | Wagner | 182/91 |
| 3,291,504 | 12/1966 | Irizarry | 280/166 |
| 3,561,786 | 2/1971 | Lentz | 182/91 X |

Primary Examiner—Robert R. Song
Assistant Examiner—R. Schrecengost
Attorney, Agent, or Firm—P. J. Schlesinger

[57] ABSTRACT

In order to provide increased ramp clearance for the front end of a bus body forwardly of the front wheels, the underbody of the bus is angled upwardly and forwardly toward the lower edge of the front bumper from a transverse line just forwardly of the front wheel wells, and a lower front step for the bus is hingedly mounted at its rear end to swing between a raised, stowed position, flush with the angled underbody, and a lowered, deployed position with the step horizontal and supported to carry the weight of passengers boarding and leaving the bus. Mechanism is provided for operating the step synchronously with the opening and closing of the bus front doors.

9 Claims, 5 Drawing Figures

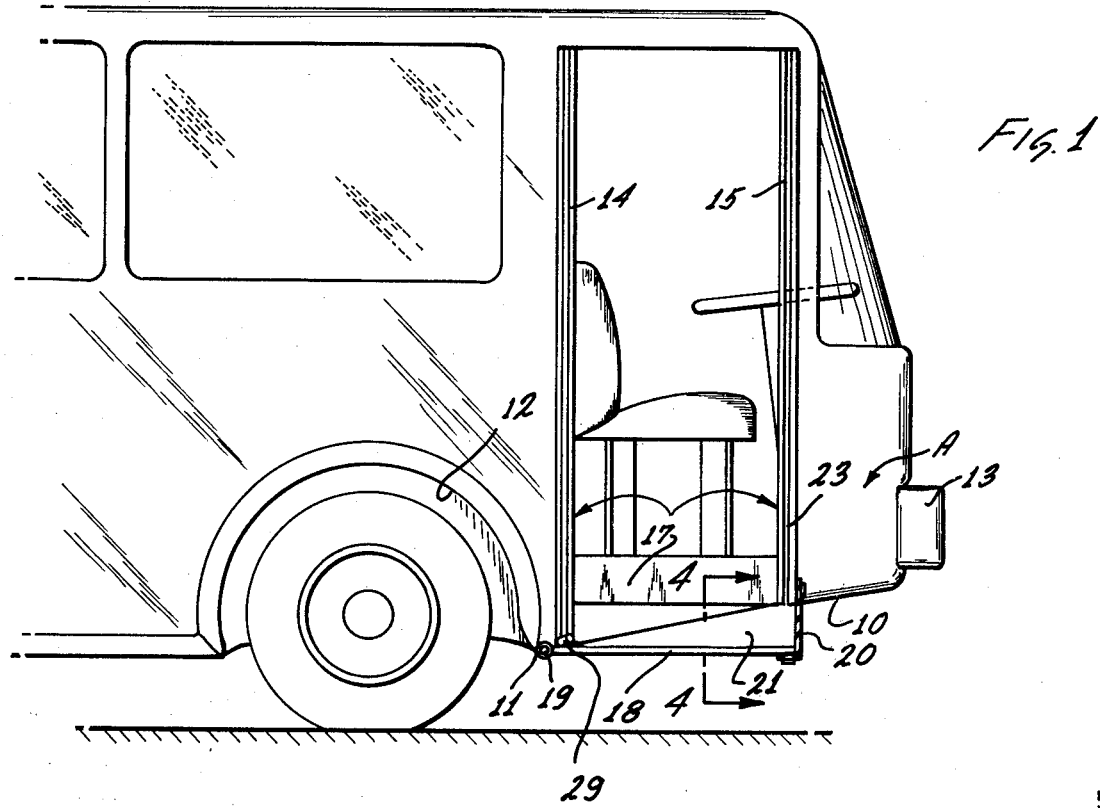
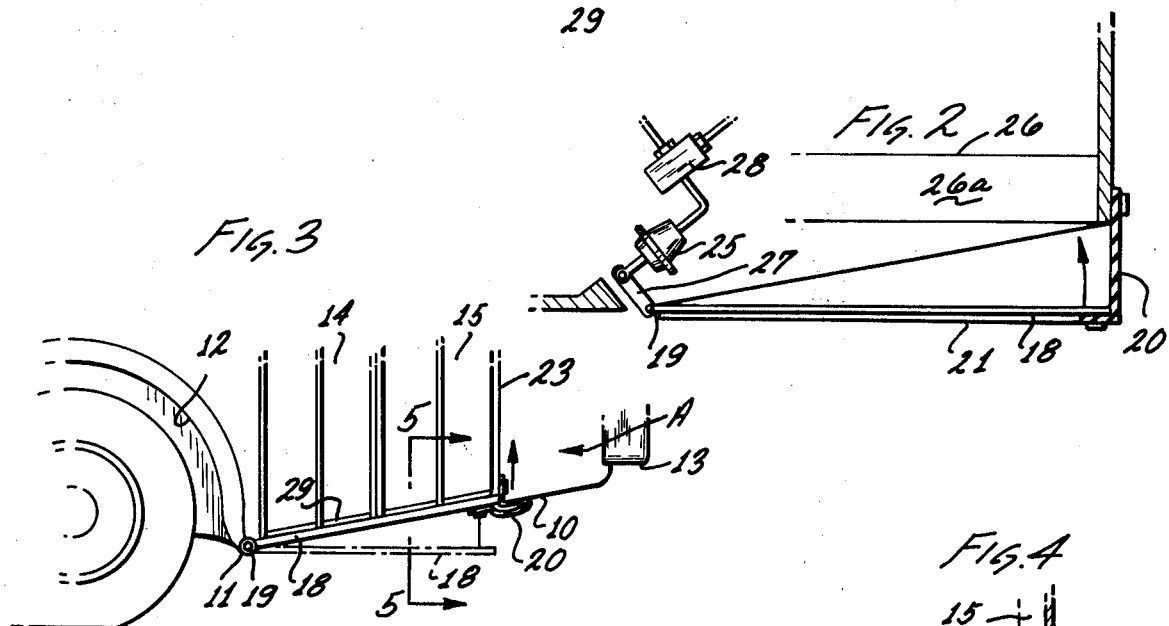
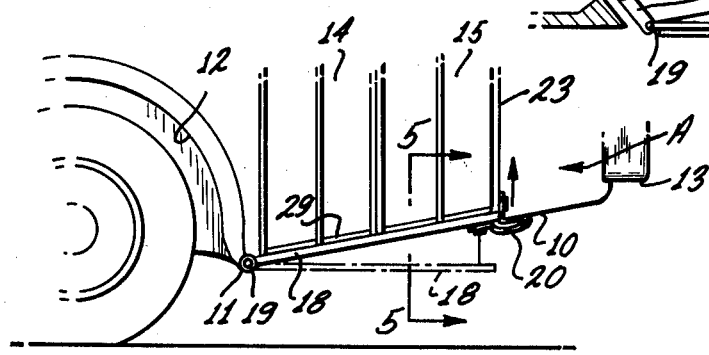
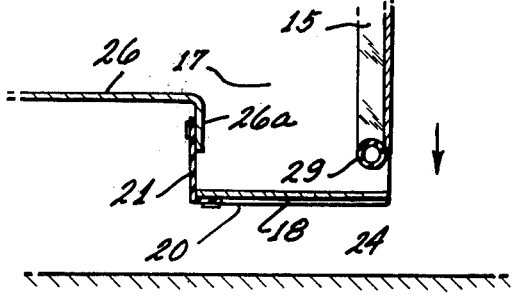
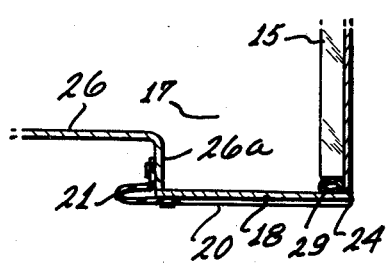

PIVOTED FRONT STEP AND ANGLED UNDER BODY FOR LOW FLOOR BUS

BACKGROUND OF THE INVENTION

In the past, various types of mechanisms have been provided for raising and lowering steps of various kinds, including steps for vehicles such as buses, house trailers, etc. and numerous patents have been granted on various types of such steps. However, none of the known prior developments either discloses or suggests a step which is hingedly or pivotally mounted at its rear end to swing about an axis extending transversely of a vehicle at the rearward end of an upwardly and forwardly sloping underbody portion, and which when stowed, is substantially flush with such upwardly sloping underbody, while when deployed it is level and projects below such underbody.

SUMMARY OF THE INVENTION

The present invention comprises a bus body having a forward portion of its underbody which slopes upwardly toward the lower edge of the front bumper, so as to provide increased ramp clearance, and with a front passenger door having its lower edge inclined to conform with this sloping underbody. A lower front step for passengers passing through this door is pivotally mounted at its rear end for swinging movement about an axis extending transversely of the bus body, the step being power actuated, synchronously with the doors, to move from a raised, stowed position, flush with the sloping underbody when the doors are closed, to a lowered, deployed position, level with its hinged rear end, and extending below the sloping underbody when the doors are open.

BRIEF DESCRIPTION OF THE DRAWINGS

The objectives and advantages of the present invention will be apparent from the following description and the accompanying drawings, wherein:

FIG. 1 is a fragmentary, side, elevational view of the forward portion of a bus embodying the invention with the front doors opened and the step embodying the present invention deployed.

FIG. 2 is a fragmentary, somewhat diagrammatic, detail view showing, in solid lines, the step in deployed, operative position, and in broken lines, in elevated, stowed position, an air diaphragm actuating the step also being shown.

FIG. 3 is a fragmentary, side elevational view showing the lower portion of FIG. 1, the step being shown in solid lines in its stowed position with the doors closed, and in broken lines in its deployed position with the doors open.

FIGS. 4 and 5 are fragmentary, sectional views taken along line 5—5 of FIG. 3, FIG. 4 showing the step deployed, and FIG. 5 showing it stowed.

DETAILED DESCRIPTION OF THE ILLUSTRATIVE EMBODIMENT OF THE INVENTION

Referring to the drawings in detail, FIGS. 1 and 3 show a bus body 10 of a newer, low floor type which has been developed in response to recommendations of the Department of Transportation of the United States Government to reduce to a practical minimum the amount of climbing and descending of steps required by passengers boarding and leaving the vehicles.

In accordance with the present invention, the underbody 10 of the bus body, beginning substantially at a transverse line 11 at the forward, lower edge of the front wheel wells 12, slopes upwardly and forwardly toward the lower edge of the usual front bumper 13 of the bus. This sloping underbody 10 provides greatly increased ramp clearance over that which would exist if the underbody were substantially horizontal throughout its length.

Twin front doors 14 and 15 are illustrated as generally conventional doors, each of which is folded double along its vertical centerline in opening to minimize their projection into the usual step well 17, see FIG. 1. The lower edges of these doors, when closed, see FIG. 3, are inclined to follow the slope of the bus underbody 10.

A lower front step 18 embodying the present invention is hingedly mounted at its rear end for pivotal movement about an axis 19 which is substantially coincident with a rear portion of the sloping underbody 10. The hinged step mounting means preferably is of a type which will not be adversely affected by freezing or exposure to salt or other chemicals frequently encountered in such environment, and may be of a suitable or conventional type comprising elastomeric material.

A combined downward limit stop, support means, and weather seal, is provided across the front end of the hinged step 18, and comprises a relatively non-stretching apron 20 of waterproof, flexible, sheet material, such as rubber covered fabric, secured in sealed relation by battens and usual fastening means to the front wall of the front stairwell, and to the under side of the forward end of the hinged step 18, respectively. A generally similar seal 21, which may be co-existensive with the first, is shown for sealing the gap between the inner edge of the hinged step 18 and a fixed bus body element comprising a downturned portion 26a, see FIGS. 4 and 5, of a second step bus floor 26.

Suitable step actuating mechanism, such as a conventional air diaphragm 25, is secured to the bus body A, and is operatively connected to the rear end of the step 18 by a lever arm 27. The diaphragm 25 preferably is operatively connected to the usual door actuating mechanism, indicated by the box 28, for opening and closing the doors 14 and 15. Thus, when the doors are opened, the step 18 will be deployed to its solid line position of FIGS. 1 and 2, and when the doors are closed the step will be stowed as shown in broken lines in FIG. 2 and in solid lines in FIGS. 3 and 5.

Suitable weather tight sealing means, for example, a conventional rubber tube seal 29, see FIGS. 4 and 5, preferably is provided along the lower edge of each of the doors, so that when the doors are closed and the step 18 is elevated to stowed position, the step will engage the tubes and compress them to sealing position as shown in FIG. 5.

The step actuating mechanism 25, while necessarily having sufficient strength to move the step 18 easily between stowed and operative position, preferably is such that it may be overcome by the weight of a passenger, not shown, stepping onto the step in case of malfunction of the operating mechanism.

OPERATION OF THE ILLUSTRATIVE FORM OF THE INVENTION

When a bus having the step 18 and sloping underbody 10 as illustrated and described herein stops, and the driver operates the door actuating mechanism 28 to open the doors 14 and 15, the step actuating mechanism 25 is operated simultaneously therewith to lower the step 18 from its stowed, solid lines position of FIG. 3, to its deployed position of FIG. 2. When all passengers have either boarded or left the bus as desired, the driver closes the doors 14 and 15 and thereby automatically elevates the step 18 to its stowed position. Thereupon the bus in ready to proceed.

The invention provides a simple, relatively inexpensive and easily maintained means for greatly increasing the ramp height clearance of a low bodied bus, and one which is fail-safe, simple, and positive in operation.

Having thus described the invention, what is claimed as new and useful, and desired to be secured by U.S. Letters Patent, is:

1. In a bus having front and rear support wheels, a low body with its forward portion extending a substantial distance forwardly of the front wheels, and a front bumper mounted on said body;
    an angled underbody portion sloping upwardly and forwardly toward the front bumper from a transverse line in the zone of the front wheels,
    a front entrance in the side of the bus above a selected portion of such sloping underbody, and,
    a pivoted step for said front entrance, said step being hingedly mounted at its rear end for limited pivotal movement about an axis extending transversely of the bus closely adjacent said sloping underbody, said step being pivotally movable between upswung, stowed position, substantially flush with the sloping underbody portion, and downswung, deployed position, substantially level, and extending downwardly below the sloping underbody portion forwardly of the step axis.

2. A pivoted step for the front entrance of a bus as claimed in claim 1, wherein door means are provided to selectively open and close the front entrance, the lower edge of the door means, when closed, defining an angle corresponding to that of the angled underbody portion.

3. A pivoted step for the front entrance of a bus as claimed in claim 2, wherein the door means comprises two folding door portions, and the lower edges of said door portions are co-extensive, and closely adjacent the outer edge of the pivoted step when the door portions are closed and the pivoted step is in its stowed position.

4. A pivoted step for the front entrance of a bus as claimed in claim 2, wherein power actuating means is provided for selectively moving the step between its stowed and deployed positions.

5. A pivoted step for the front entrance of a bus as claimed in claim 4, wherein power actuating means is provided for the doors, and the power actuating means for the step is operatively connected to the door actuating means for deploying the step simultaneously with the opening of the doors, and for stowing the step simultaneously with the closing of the doors.

6. A pivoted step for the front entrance of a bus as claimed in claim 1, wherein means limiting pivotal movement of the pivoted step toward its deployed position comprises a flexible, substantially non-stretchable member, the upper edge of which flexible member is attached to the bus body, and the lower edge of which flexible member is attached to a forward element of the pivoted step, said flexible element being of a length to extend, fully extended, from the bus body to the step element to which it is attached with the pivoted step in its deployed position.

7. A pivoted step for the front entrance to a bus as claimed in claim 6, wherein the flexible element is of flexible waterproof sheet material, and said flexible element extends across the front end of the pivoted step with the upper edge of the flexible element attached in selaed relation to an element of the bus body, and its lower edge attached in sealed relation along the forward edge of the pivoted step.

8. A pivoted step for the front entrance to a bus as claimed in claim 7, wherein a second sheet of flexible, waterproof material extends also along the inner edge of the pivoted step, with the upper edge of the second sheet attached in sealed relation to an element of the bus body, and the lower edge of the second sheet attached in sealed relation along the inner edge of the hinge step.

9. A pivoted step for the front entrance of a bus as claimed in claim 2, wherein sealing means is interposed between the lower edge of the door means, when the latter is closed, and the laterally outward edge of the pivoted step when in its stowed position.

* * * * *